(Model.)
O. P. JACKSON.
Manufacture of Underground Telegraphic Conductors.
No. 237,282. Patented Feb. 1, 1881.
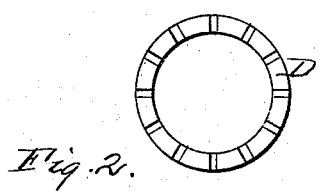
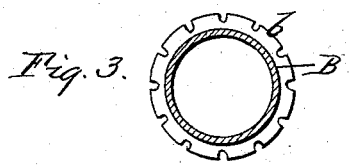
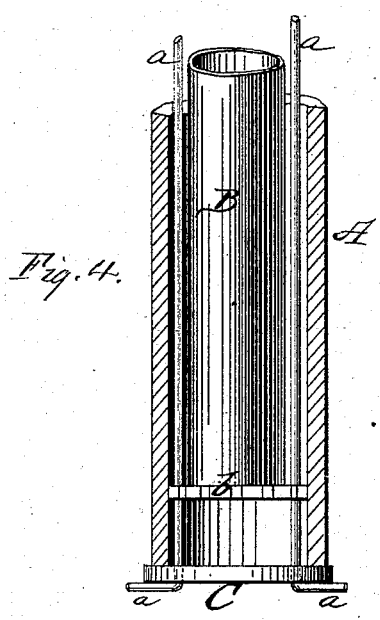
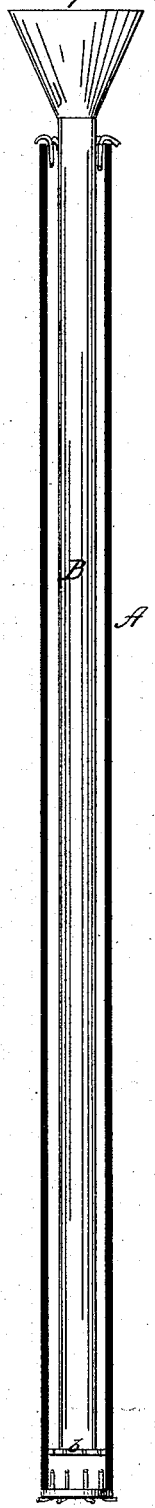
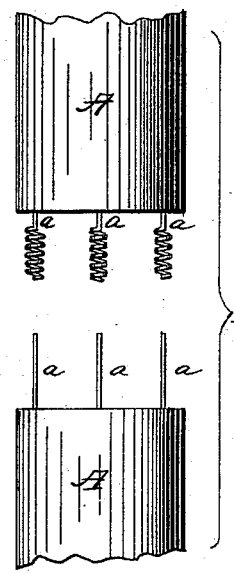
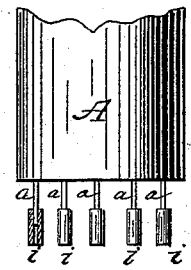
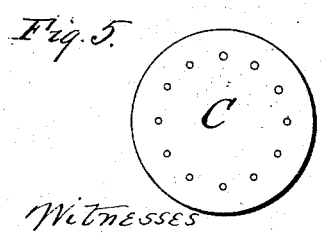
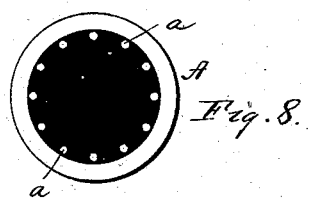
Witnesses
D. P. Cowl
L. Bacon
Oliver P. Jackson,
Inventor
by Connolly Bros & Wright
Attorneys

UNITED STATES PATENT OFFICE.

OLIVER P. JACKSON, OF PITTSBURG, PENNSYLVANIA, ASSIGNOR OF THREE-FOURTHS TO S. W. KERR, H. D. SELLERS, AND JOHN M. PATTERSON, OF SAME PLACE.

MANUFACTURE OF UNDERGROUND TELEGRAPHIC CONDUCTORS.

SPECIFICATION forming part of Letters Patent No. 237,282, dated February 1, 1881.

Application filed November 12, 1880. (Model.)

*To all whom it may concern:*

Be it known that I, OLIVER P. JACKSON, of Pittsburg, in the county of Allegheny and State of Pennsylvania, have invented certain new and useful Improvements in the Manufacture of Underground Telegraphs; and I do hereby declare the following to be a full, clear, and exact description of the invention, such as will enable others skilled in the art to which it pertains to make and use it, reference being had to the accompanying drawings, which form part of this specification, in which—

Figure 1 is a side elevation of my machinery. Figs. 2, 3, 4, and 5 are details. Fig. 6 is the coupling; Fig. 7, a modification of same; Fig. 8, an end view of article.

This invention relates to improvements in the manufacture of underground telegraphs; and it consists in a vertical pouring-tube having a notched or perforated flange at its lower end, a tube of suitable material which becomes a part of the product, and a notched or perforated temporary bottom for said tube, substantially as hereinafter described.

A designates a tube of glass of convenient length. A number of wires, *a*, a little longer than the tube A, are inserted as follows: A tube, B, of smaller diameter than tube A, having a notched or perforated flange, *b*, at its lower end, and a funnel or pouring-cup, *c*, at its top, is lowered into tube A till its flanged extremity reaches, or nearly reaches, the bottom of tube A. Then a plate, C, having holes corresponding to the notches or perforations in flange *b*, is placed against bottom of tube A and the wires pushed up through it and in the notches in flange *b*, and then onward to the top of tube A sufficient to project slightly, so as to leave room at both ends for the coupling-tips. Everything is now ready for pouring, as shown in Fig. 1. Then melted pitch, or its equivalent, is poured into tube B above, passes through it and begins to fill tube A and surround the wires *a*. Tube A is gradually withdrawn from tube B, or vice versa, and the tube A becomes gradually filled with the insulating substance, while the wires are held to their proper position relatively by the notched flange *b*, the latter keeping its hold upon the wires until they are surrounded with the pouring material. When tube A is full tube B will have been withdrawn completely, after which, by taking off plate C, the tube A, with its contents, forms a complete length of underground telegraph. To conveniently retain the plate C, I prefer to bend the wires projecting through it, as shown by Figs. 1 and 4.

A notched thimble, D, may be temporarily applied to the top of tube A, into whose notches the upper ends of wires *a* may be bent to keep the wires from binding on the flange *b* during the latter's movements.

If desired, flange *b* is made thicker than, and its notches made to closely fit, the wires *a*, so that in being drawn upwardly, besides merely preserving the positions of the wires, it will also strengthen them.

The tube A may be of glass, vulcanized fiber, or its kindred substances, celluloid, or paper properly treated, or of any water-proof or moisture-proof substance.

At one end of each section the wires *a* are coiled, as in Fig. 6, to form a socket, the wires at the other end being left straight, as in same figure. The straight wires of one section enter the sockets on the other end, and are either clinched or soldered therein; or a small tube, *i*, may be clinched on one wire and the other passed into it and treated as before. The ends so coupled are then protected by any suitable means.

The material poured into the tube A may be pitch, or a compound of pitch and paraffine, or any substance found to possess adequate insulating properties.

The plant required for production is so remarkably simple that the article may be prepared on the spot and laid as soon as cooled.

With an assortment of the plates C of different sizes and forms and a corresponding set of adjustable flanges, *b*, the plant is complete for all requirements in laying a system of lines to suit any demand.

New wires may be introduced at any point in the line, or wires already in may be discontinued and branch off, so that any desired distribution or consolidation of lines may be readily effected in a given locality.

I claim as my invention—

1. The temporary pouring-tube B, having notched or perforated flange b, in combination with the tube A and its temporary perforated plate C, substantially as described.

2. The combination of the interior pouring-tube, B, having means of separating and guiding the wires, with the exterior tube, A, which is adapted to become a part of the product, substantially as set forth.

In testimony that I claim the foregoing I have hereunto set my hand.

OLIVER P. JACKSON.

Witnesses:
 JOHN M. PATTERSON,
 T. J. McTIGHE.